(12) United States Patent
Ju et al.

(10) Patent No.: US 8,861,411 B2
(45) Date of Patent: Oct. 14, 2014

(54) APPARATUS AND METHOD FOR REDUCING INTERFERENCE AND SAVING ENERGY IN FEMTO/PICO CELL OF HIERARCHICAL CELL STRUCTURE

(75) Inventors: Hyeong-Jong Ju, Suwon-si (KR); Hyon-Goo Kang, Suwon-si (KR); Byoung-Ha Yi, Seoul (KR); Ki-Young Han, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 180 days.

(21) Appl. No.: 13/043,328

(22) Filed: Mar. 8, 2011

(65) Prior Publication Data

US 2011/0216683 A1   Sep. 8, 2011

(30) Foreign Application Priority Data

Mar. 8, 2010   (KR) .................. 10-2010-0020371

(51) Int. Cl.
  *G08C 17/00*   (2006.01)
  *H04W 4/00*   (2009.01)
  *H04W 52/00*   (2009.01)
  *H04W 52/02*   (2009.01)

(52) U.S. Cl.
  CPC ............... *H04W 52/00* (2013.01); *Y02B 60/50* (2013.01); *H04W 52/0206* (2013.01)
  USPC ............ 370/311; 370/328; 370/331; 370/332

(58) Field of Classification Search
  None
  See application file for complete search history.

(56) References Cited

U.S. PATENT DOCUMENTS

| 6,807,163 | B1 * | 10/2004 | Shi ................................. 370/337 |
| 2002/0168993 | A1 * | 11/2002 | Choi et al. .................... 455/522 |
| 2005/0049013 | A1 * | 3/2005 | Chang et al. .................. 455/574 |
| 2009/0286496 | A1 * | 11/2009 | Yavuz et al. ............... 455/127.1 |
| 2010/0197306 | A1 * | 8/2010 | Lopes ........................ 455/435.1 |
| 2011/0105132 | A1 * | 5/2011 | Vasudevan et al. ........... 455/448 |
| 2011/0211514 | A1 * | 9/2011 | Hamalainen et al. ......... 370/311 |
| 2012/0238273 | A1 * | 9/2012 | Lim et al. ...................... 455/436 |
| 2012/0289178 | A1 * | 11/2012 | Matsumura et al. .......... 455/403 |

* cited by examiner

*Primary Examiner* — Faruk Hamza
*Assistant Examiner* — Diane Lo (57) ABSTRACT

An apparatus and a method manage power of a small base station. Whether a notify message indicating that a subscribed terminal enters a macro base station that includes an off-small base station is received from the macro base station under a closed access mode is determined. When the notify message is received, whether a service is providable to the subscribed terminal is determined. When the service is providable to the subscribed terminal, the small base station is turned on. During the closed access mode or when a load of a macro cell is large during an open access mode, when a terminal that should be serviced does not exist in the neighborhood of a small base station, an interference and power consumption unnecessarily generated may be reduced by turning off the small base station.

18 Claims, 9 Drawing Sheets

APPARATUS AND METHOD FOR REDUCING INTERFERENCE AND SAVING ENERGY IN FEMTO/PICO CELL OF HIERARCHICAL CELL STRUCTURE

CROSS REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Mar. 8, 2010 and assigned Serial No. 10-2010-0020371, the entire disclosure of which is hereby incorporated by reference.

TECHNICAL FIELD OF THE INVENTION

The present invention relates to a mobile communication system. More particularly, the present invention relates to an apparatus and a method for allowing a femto/pico base station that is in a turn-off state to recognize serviceable terminals and automatically transitioning a femto/pico base station to a turn-on state for the purpose of operating for interference reduction and power save under a wireless environment where a femto cell/pico cell and a macro cell are mixed.

BACKGROUND OF THE INVENTION

A small base station generally called a femto cell/pico cell is inexpensive and may provide a high-speed data service. In addition, because the small base station can provide a high quality service to a user located in a shadow area, it may be an attractive solution to a mobile communication service provider or users.

The femto/pico cell is divided into an open access mode and a closed access mode depending on an access policy. The open access mode allows all subscribers who have subscribed to a service of a service provider to access the cell within a radius of a base station. The closed access mode does not allow all subscribers' access but allows an access to only a specific user group. In addition, a hybrid access mode supports these two modes.

When femto/pico cells are installed inside a macro cell region and operated, the femto/pico cells need to be turned off for interference reduction and conserving power as needed.

More particularly, because an interference that a femto/pico cell causes to a macro cell has an influence on the performance of the existing macro cell, the interference should be minimized. One of methods for reducing the interference of a femto/pico cell is to change the state of the femto/pico cell to a turn-off state in which the femto/pico cell suspends signal transmission when needed. The femto/pico cell has a relatively small cell size, such that a situation in which a terminal that belongs to the femto/pico cell does not exist frequently occurs.

Therefore, when a terminal to which the femto/pico base station should provide a service does not exist, when the femto/pico base station suspends signal transmission, an interference to the macro cell does not occur. However, in this situation, even when a new terminal enters the femto/pico cell region, the femto/pico cell cannot automatically wake up.

More particularly, because the femto/pico cell base station does not send any signal, a terminal cannot recognize that it is in the femto/pico cell region, and cannot recognize the femto/pico cell region to which the terminal belongs.

SUMMARY OF THE INVENTION

To address the above-discussed deficiencies of the prior art, it is a primary aspect of the present invention to address at least the above-mentioned problems and/or disadvantages and to provide at least the advantages described below. Accordingly, an aspect of the present invention is to provide an apparatus and a method for reducing an interference and saving energy in a femto/pico cell of a hierarchical cell structure.

Another aspect of the present invention is to provide an apparatus and a method for allowing a femto/pico base station that is in a turn-off state to recognize terminals and automatically transitioning the femto/pico cell base station to a turn-on state for the purpose of operating the femto/pico cell base station for interference reduction and power save under a wireless environment in which a pico cell/femto cell and a macro cell are mixed.

In accordance with an aspect of the present invention, a method for managing power of a small base station is provided. The method includes determining whether a notify message indicating that a subscribed terminal enters a macro base station that includes an off-small base station is received from the macro base station under a closed access mode. When the notify message is received, whether a service is providable to the subscribed terminal is determined. And when the service is providable to the subscribed terminal, the small base station is turned on.

In accordance with another aspect of the present invention, an apparatus of a small base station for performing power management is provided. A power manager determines whether a notify message indicating that a subscribed terminal enters a macro base station that includes an off-small base station is received from the macro base station under a closed access mode. When the notify message is received, the power manager determines whether a service is providable to the subscribed terminal. And when the service is providable to the subscribed terminal, the power manager turns on the small base station. A transceiver communicates with the subscribed terminal and the macro base station.

In accordance with yet another aspect of the present invention, a small base station that performs power management is provided. A transceiver communicates with terminals and a macro base station. A power manager determines whether a subscribed terminal has entered a cell of the macro base station that includes the small base station that is currently in an off-state during a closed access mode, determines whether a service is providable to the subscribed terminal when the subscribed terminal has entered the cell of the macro base station when the small base station is currently in the off-state during the closed access mode, and turns the small base station on when the service is providable to the subscribed terminal.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Embodiments of the present invention provide an apparatus and a method for reducing an interference and saving energy in a femto/pico cell of a hierachical cell structure. Though WiMAX system is used as an example in describing an embodiment of the present invention, the present invention is applicable to a different mobile communication system with a hierachical cell environment.

Embodiments of the present invention divisionally describe operation methods for a closed access mode and an open access mode, respectively. Though a hybrid access mode is not described separately, the two proposed methods may be simultaneously operated in the hybrid access mode. On/off in embodiments of the present invention denote on/off of a Radio Frequency (RF) function. In embodiments of the present invention, the femto/pico base station may be called a small base station.

A closed access mode will be described as follows.

Unlike an open access mode, the closed access mode provides a service to only specific terminals. In embodiments of the present invention, a femto/pico base station maintains information as illustrated in FIG. 1.

Figure 1:
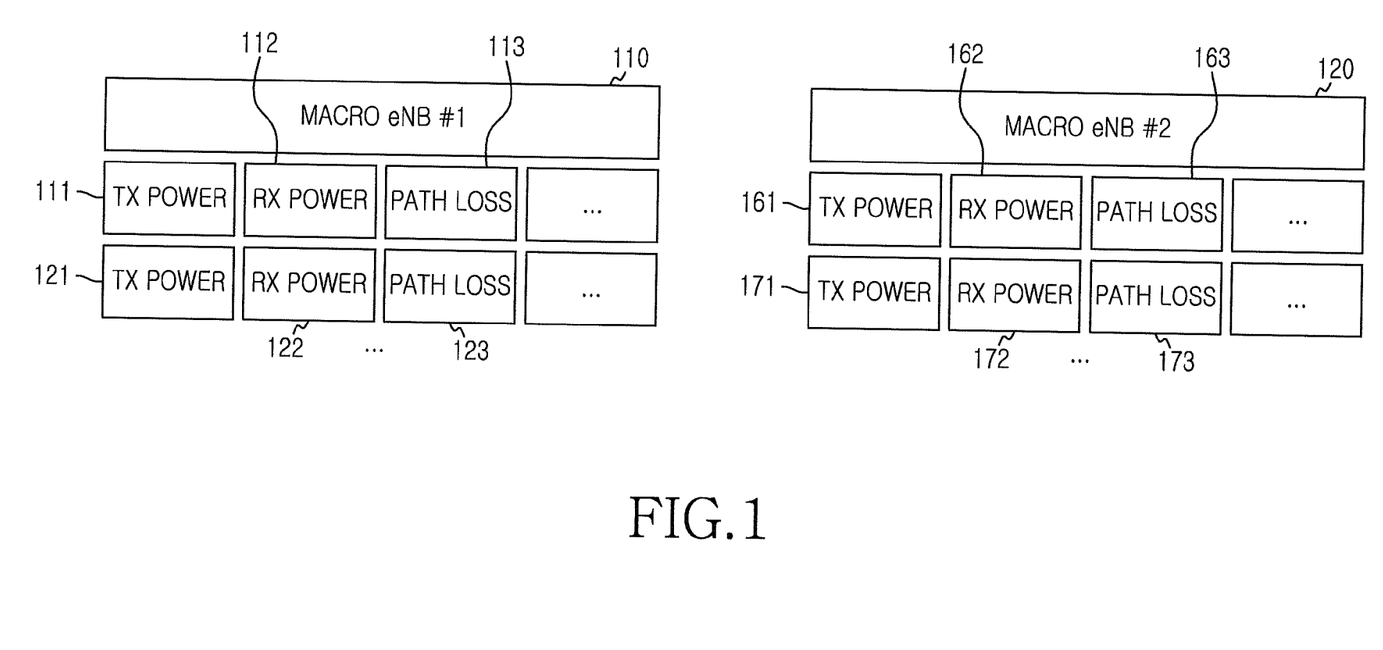
FIG. 1 illustrates a view of uplink signal information determined by a femto/pico eNB at the moment at which a terminal managed and serviced by a femto/pico eNB performs a handover to a specific macro eNB as a target eNB, or a time just before the handover in a closed access mode according to an embodiment of the present invention.

FIG. 1 illustrates a view of uplink signal information determined by a femto/pico eNB at the moment at which a terminal managed and serviced by a femto/pico eNB performs a handover to a specific macro eNB as a target eNB, or the time right before the handover in a closed access mode according to an embodiment of the present invention.

Referring to FIG. 1, a femto/pico eNB has TX powers 111, 121, 161 and 171, RX powers 112, 122, 162, and 172, and path losses 113, 123, 163, and 173 for respective terminals which have performed a handover to a specific macro eNB 110 and 120 through measurement. In addition, the femto/pico eNB maintains the above information respectively for macro eNBs 110 and 120. Here, the path loss is described below. In the following description, an eNB denotes a macro eNB unless specified otherwise.

Figure 2:
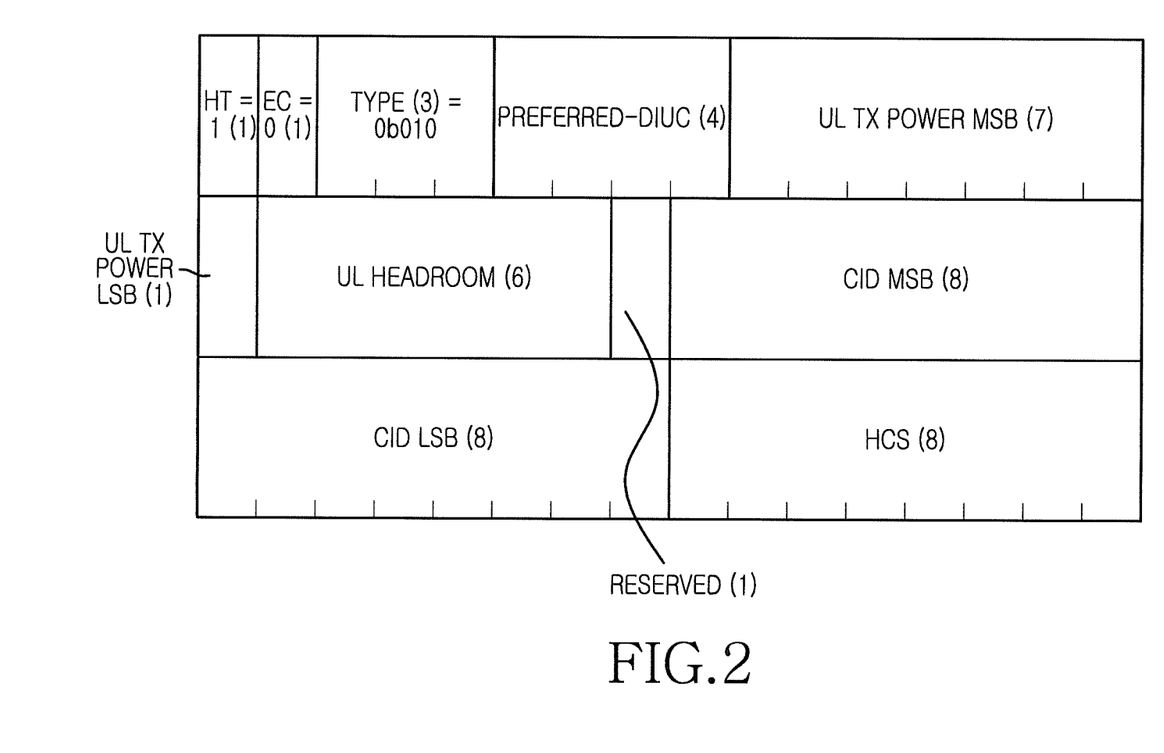
FIG. 2 illustrates a view of a physical channel report header used in IEEE 802.16 according to an embodiment of the present invention.

FIG. 2 illustrates a view of a physical channel report header used in IEEE 802.16 according to an embodiment of the present invention.

Referring to FIG. 2, an eNB controls uplink transmission power of a terminal. At this point, the eNB may determine transmission power information of the terminal using a control message which the terminal periodically reports to the eNB.

The control message may be one of messages of various kinds, and is transmitted from the terminal to the eNB. FIG. 2 illustrates an example of the control message. In the message of FIG. 2, a "UL TX power" field exists, which is described below.

The UL TX power field denotes transmission power used for a burst included in a message, and is reported on a dBm basis, and is quantized every 0.5 dBm level from −84 dBm (encoded as 0x00) to 43.5 dBm (encoded as 0xFF).

At the moment or the time closest to the moment when a handover of a terminal to the macro eNB 110 and 120 of FIG. 1 as targets occurs, a femto/pico eNB calculates a path loss using Prx and Ptx. A related equation is as follows.

$$\text{Path loss (dB)} = Ptx \text{ (dBm)} - Prx \text{ (dBm)} \qquad \text{[Eqn. 1]}$$

where Ptx is current Tx power of a terminal and is transmitted through a media access control (MAC) control message from the terminal to the eNB and may use the "UL TX power" field, and Prx is reception power that determines an uplink data region via which the message is transmitted in the femto/pico eNB.

Figure 3:
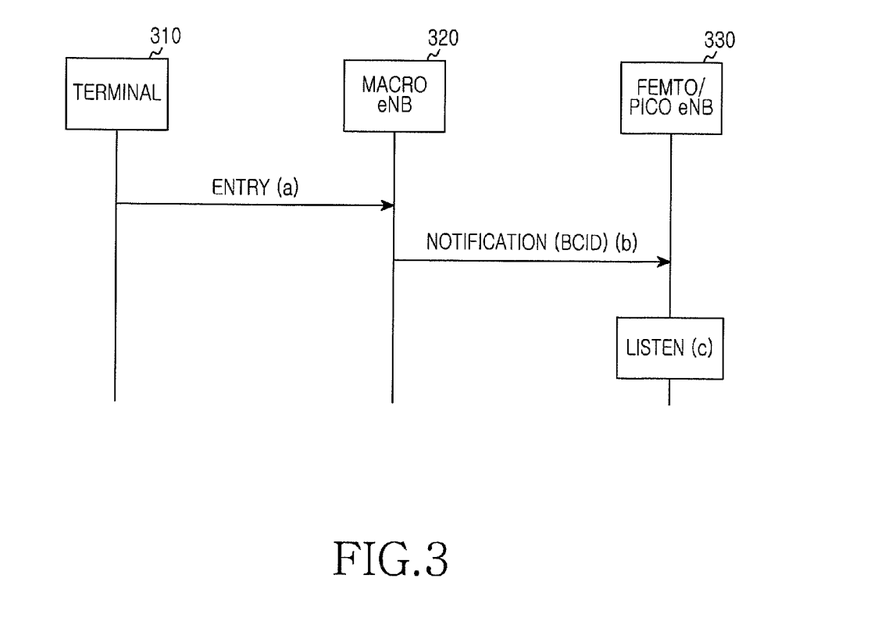
FIG. 3 illustrates a process in which a macro eNB informs a femto/pico eNB of entry of a subscribed terminal when the terminal enters the relevant macro cell in a closed access mode according to an embodiment of the present invention.

FIG. 3 illustrates a process where a macro eNB informs a femto/pico eNB of entry of a subscribed terminal when the terminal enters the relevant macro cell in a closed access mode according to an embodiment of the present invention.

Referring to FIG. 3, when the terminal 310 enters the macro cell (step a), the macro eNB 320 informs the femto/pico eNB 330 of the entry of the terminal 310 using a notification message (step b).

At this point, according to an embodiment of the present invention, a Basic Connection Identifier (BCID) allocated to the terminal 310 is added to the notification message. The femto/pico eNB 330 that has received this message performs monitoring for the macro eNB 320 (step c).

Figure 4:
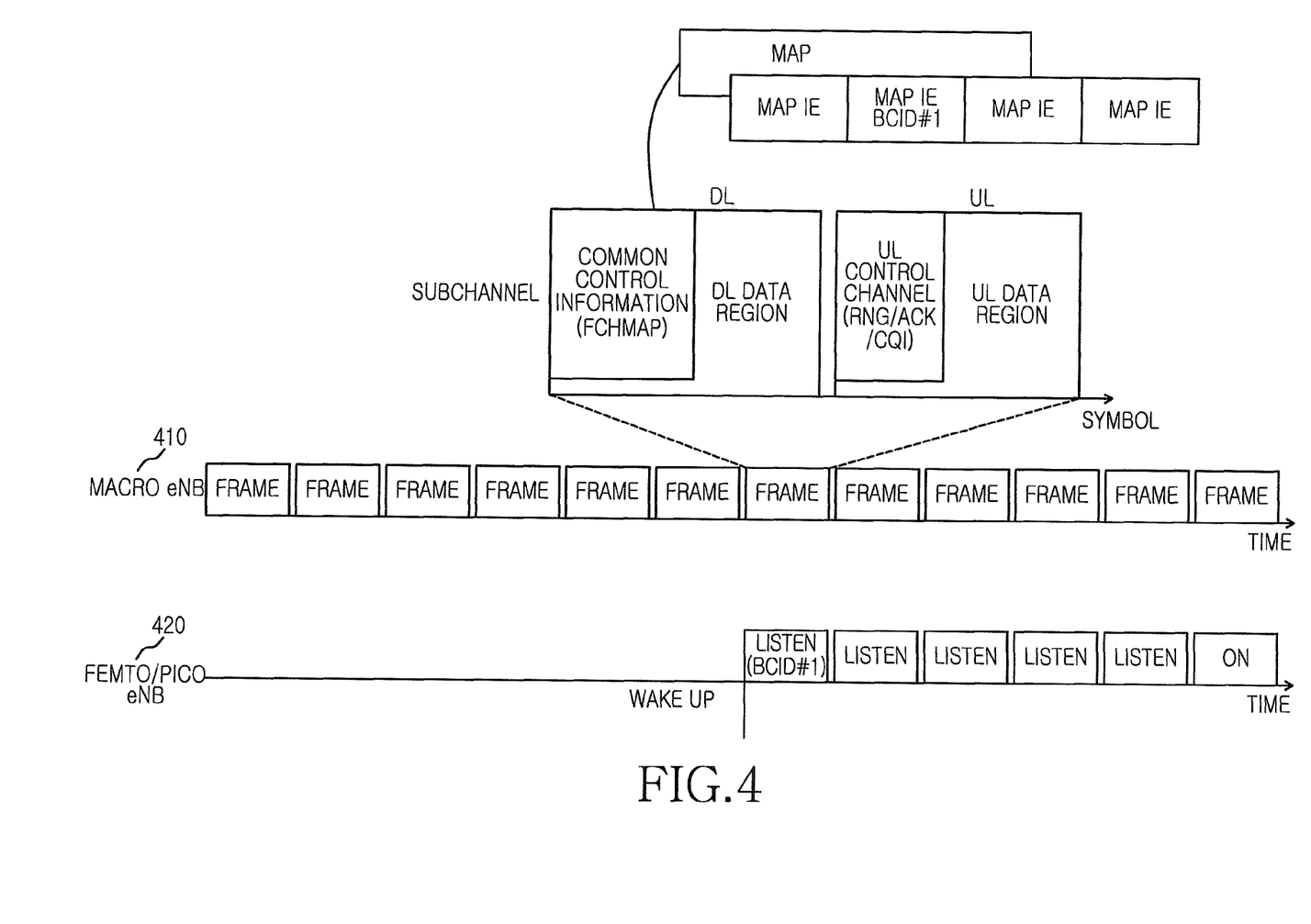
FIG. 4 illustrates an example of an operation of a femto/pico cell eNB that analyzes a signal of a macro eNB and is turned on in a closed access mode according to an embodiment of the present invention.

FIG. 4 illustrates an example of an operation of a femto/pico cell eNB that analyzes a signal of a macro eNB and is turned on in a closed access mode according to an embodiment of the present invention.

Referring to FIG. 4, a process of turning on an off-femto/pico eNB 420 is illustrated. When a terminal subscribed to the femto/pico eNB 420 enters a macro cell, the macro eNB 410 informs the femto/pico eNB 420 of the entry of the terminal by transmitting a notification message to the femto/pico eNB 420.

Then, the femto/pico eNB 420 wakes up, and then, receives MAP information including a BCID every frame transmitted by the macro eNB 410, monitors uplink traffic from the terminal to the macro eNB to determine whether to turn on. At this point, the on/off-decision may be made using Equation 2 below.

By doing so, the femto/pico eNB is turned on for a smaller region than a macro cell region (or a paging region), such that an interference is reduced and energy consumption is reduced.

$$\text{Currently determined path loss} < \text{handoff average path loss} + \text{margin} \qquad [\text{Eqn. 2}]$$

where the currently determined path loss may be determined using Equation 1. When an uplink path loss determined using Equation 2 is smaller than a handoff average path loss of the terminal, it is determined that the determined uplink path loss is in a serviceable range. Here, a margin is a value determined by experiment or depending on realization.

Figure 5:
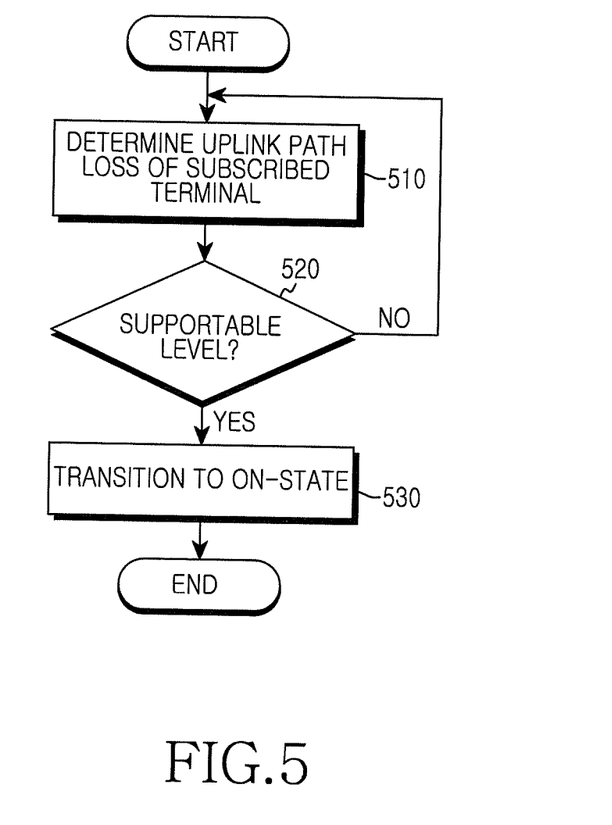
FIG. 5 illustrates a process for on-decision of a femto/pico eNB while listening in a closed access mode according to an embodiment of the present invention.

FIG. 5 illustrates a process for on-decision of a femto/pico eNB while listening in a closed access mode according to an embodiment of the present invention.

Referring to FIG. 5, the femto/pico eNB determines an uplink path loss of a subscribed terminal (block 510). When the determined path loss is a level supportable by the femto/pico eNB (block 520), the femto/pico eNB is turned on (block 530).

That is, when the subscribed terminal is within a supportable range, the femto/pico eNB is turned on.

Whether the path loss is a supportable level may be determined by a service provider based on a simulation value or a determined measurement value. A path loss calculation process is performed using Equation 1 or 2.

Now, An open access mode will be described as follows.

The open access mode allows access to all subscribers who have subscribed to the service within the radius of the eNB. In addition, in the open access mode, the femto/pico eNB records the same information whenever a terminal that is being serviced by the femto/pico eNB performs a handover to a macro eNB as a target according to the closed access mode.

Figure 6:
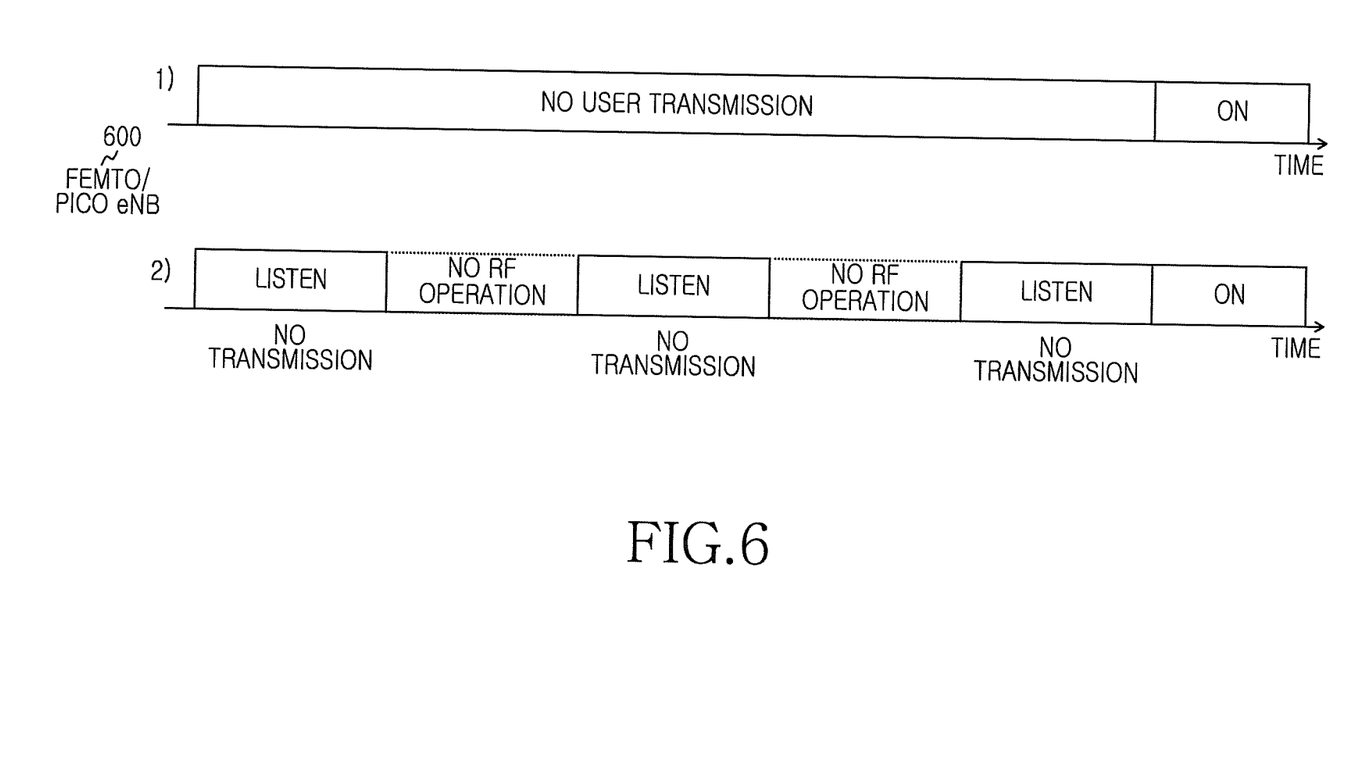
FIG. 6 illustrates an operation of a femto/pico eNB that analyzes a signal of a macro eNB and is turned on in an open access mode according to an embodiment of the present invention.

FIG. 6 illustrates a view of an operation of a femto/pico eNB that analyzes a signal of a macro eNB and is turned on in an open access mode according to an embodiment of the present invention.

Referring to FIG. 6, an off-femto/pico eNB 600 periodically monitors a signal of a macro cell. During a monitoring method, the femto/pico eNB 600 leaves only a reception RF function of an entire RF function and turns off a transmission RF function according to the situation of 1). Alternatively, the femto/pico eNB 600 monitors using only a reception RF function periodically and turns off the entire RF function during the other sections according to the situation of 2).

Figure 7:
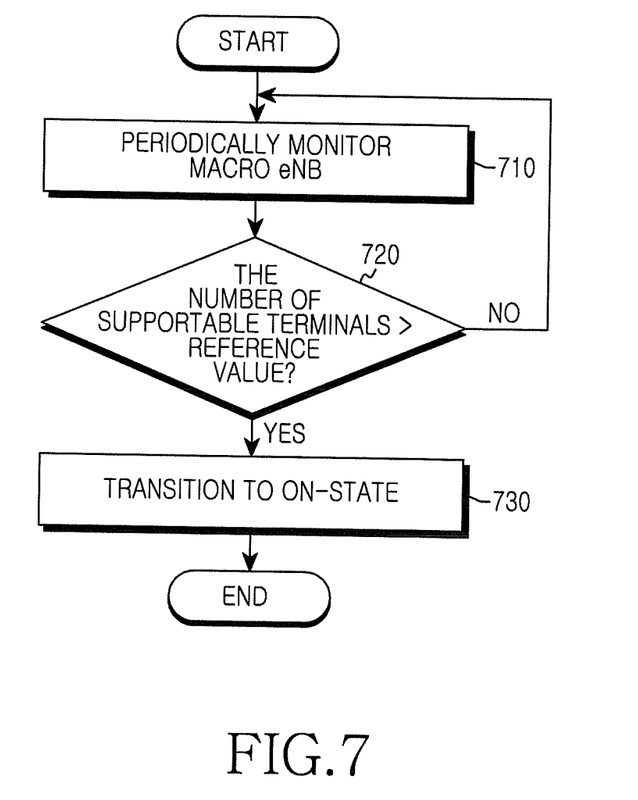
FIG. 7 illustrates a process of on-decision of an off-femto/pico eNB in an open access mode according to an embodiment of the present invention.

FIG. 7 illustrates a process for on-decision of an off-femto/pico eNB in an open access mode according to an embodiment of the present invention.

FIG. 7 illustrates a process of allowing an off-femto/pico eNB to periodically monitor MAP information transmitted by a macro eNB, and to be turned on using the periodically monitored MAP information in an open access mode. The off-femto/pico eNB periodically monitors a signal of a terminal with respect to all terminals included in the MAP information using the MAP information (block 710).

When the number of terminals with a path loss of a degree that may be serviceable by the femto/pico eNB is greater than a reference number of terminals (block 720), the femto/pico eNB is turned on (block 730).

Whether the terminal is serviceable by the femto/pico eNB is determined using the same method described with regard to the closed access mode using calculation of a determined path loss, and the reference number of terminals for turning on may change depending on an installation purpose of a service provider or an eNB.

Figure 8:
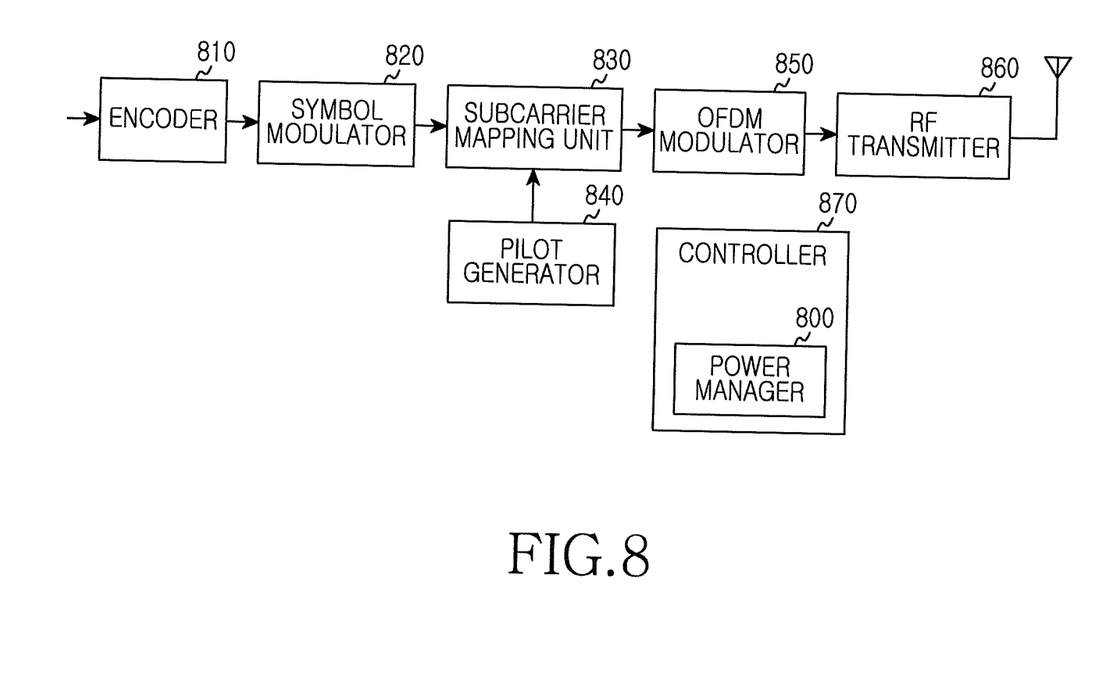
FIG. 8 illustrates a block diagram of a transmitter of a femto/pico eNB according to an embodiment of the present invention.

FIG. 8 illustrates a block diagram of a transmitter of a femto/pico eNB according to an embodiment of the present invention.

Referring to FIG. 8, the femto/pico eNB includes an encoder 810, a symbol modulator 820, a subcarrier mapping unit 830, a pilot generator 840, an OFDM modulator 850, an RF transmitter 860, and a controller 870. Here, the controller 870 includes a power manager 800. In addition, the controller 800 controls the other functional blocks 810 to 860.

The encoder 810 encodes a data bit line provided from an upper block (not illustrated). The symbol modulator 820 modulates the encoded bit line to convert the same to complex symbols.

The pilot generator 840 generates pilot signals and provides the pilot signals to the subcarrier mapping unit 830. At this point, when pilot signals are scrambled, the pilot generator 840 multiplies the pilot signal line by a scrambling code and provides the pilot signals multiplied by the scrambling code to the subcarrier mapping unit 830.

The subcarrier mapping unit 830 configures signals in a frequency domain by mapping the complex symbol and the pilot signal to a subcarrier.

The OFDM modulator 850 converts signals in the frequency domain into signals in a time domain by performing Inverse Fast Fourier Transform (IFFT), and configures OFDM symbols in a baseband by inserting a Cyclic Prefix (CP) into the signals.

The RF transmitter 860 converts OFDM symbols in the baseband into RF signals, and transmits the same via an antenna.

In the closed access mode, the power manager 800 determines an uplink path loss of a subscribed terminal. When the determined path loss is a level supportable by the femto/pico eNB, the femto/pico eNB is turned on. Whether the path loss is the supportable level may be determined by a service provider based on a simulation value or a determined measurement value. A path loss calculation process is performed using Equation 1 or 2.

In the open access mode, the power manager 800 periodically monitors a signal of a macro cell. When the number of terminals with a path loss of a degree serviceable by the femto/pico eNB is greater than a predetermined reference number (block 720), the femto/pico eNB is turned on. Whether the terminal is serviceable by the femto/pico eNB is determined using the same method described with regard to the closed access mode using calculation of a determined path loss, and the reference number of terminals for turning on may change depending on an installation purpose of a service provider or an eNB.

In the above-described block configuration, the controller 870 may perform the function of the power manager 800. Separate configuration and illustration of the power manager 800 in FIG. 8 is for separately describing each function and does not limit the scope of the present invention.

Therefore, in actual realization of a product, all or some of functions of the power manager 800 may be processed by the controller 870. In addition, the remaining functional blocks excluding the controller 870 may collectively be called a transmitter.

Figure 9:
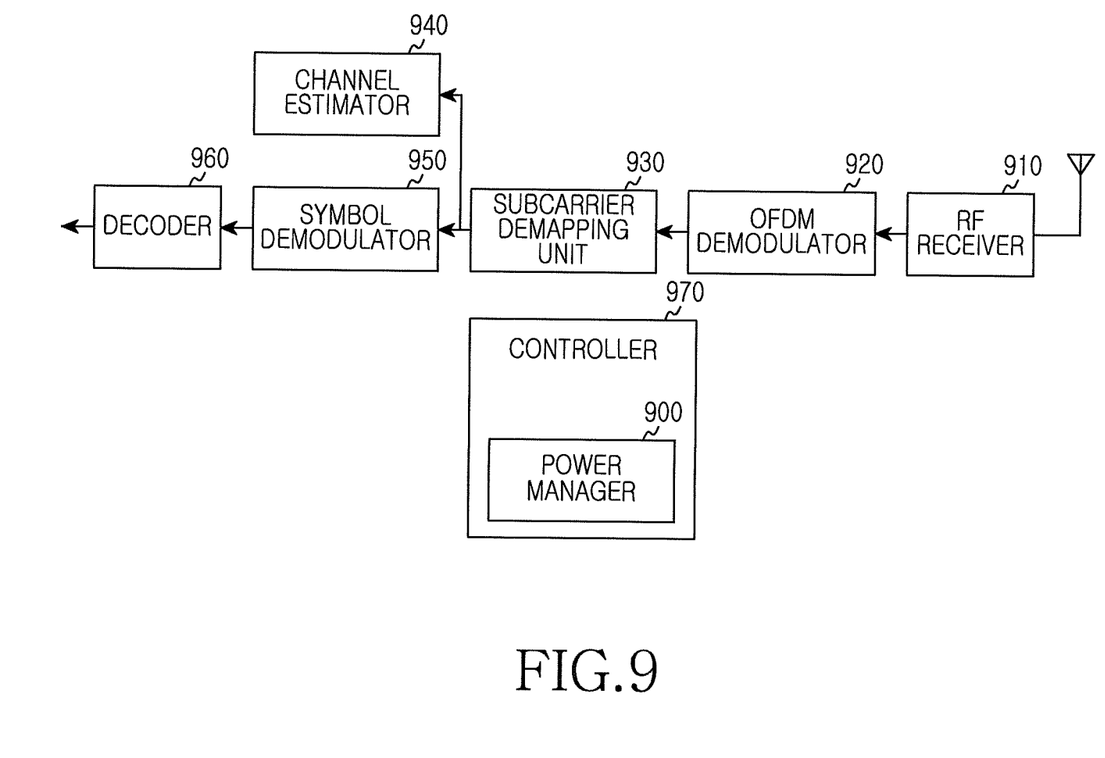
FIG. 9 illustrates a block diagram of a receiver of a femto/pico eNB according to an embodiment of the present invention.

FIG. 9 illustrates a block diagram of a receiver of a femto/pico eNB according to an embodiment of the present invention.

Referring to FIG. 9, the base station includes an RF receiver 910, an OFDM demodulator 920, a subcarrier demapping unit 930, a channel estimator 940, a symbol demodulator 950, a decoder 960, and a controller 970. The controller 970 includes a power manager 900. In addition, the controller controls the other functional blocks 910 to 960.

The RF receiver 910 converts an RF signal received via an antenna into a baseband signal. The OFDM demodulator 920 divides the baseband signal on an OFDM symbol basis, removes a CP, and recovers complex symbols mapped to a frequency domain by performing Fast Fourier Transform (FFT).

The channel estimator 940 estimates a channel matrix using a pilot signal provided from the subcarrier demapping unit 930.

The symbol demodulator 950 demodulates the complex symbols to convert the same to an encoded bit line. The decoder 960 decodes the encoded bit line to provide the same to an upper block.

The function of the power manager 900 is the same as that of the power manager 800 of FIG. 8.

In the above-described block configuration, the controller 970 may perform the function of the power manager 900. Separate configuration and illustration of the power manager 900 is for separately describing each function and does not limit the scope of the present invention.

Therefore, in actual realization of a product, all or some of functions of the power manager 900 may be processed by the controller 970. In addition, the remaining functional blocks excluding the controller 970 may collectively be called a transmitter.

According to embodiments of the present invention, in the closed access mode, when a terminal that should be serviced (or is registered) does not exist in the neighborhood of a femto/pico eNB, an interference and power consumption unnecessarily generated due to turn-on of the femto/pico eNB may be reduced. When a load of a macro cell is large in the open access mode, and when a terminal that should be serviced does not exist in the neighborhood of a femto/pico eNB, an interference and power consumption unnecessarily generated due to turn-on of the femto/pico eNB may be reduced.

Although the present disclosure has been described with an embodiment, various changes and modifications may be suggested to one skilled in the art. It is intended that the present disclosure encompass such changes and modifications as fall within the scope of the appended claims.

What is claimed is:

1. A method for managing power of a small base station, the method comprising:
   receiving from a macro base station, by a power manager, a notify message indicating that a subscribed terminal enters the macro base station that includes a small base station in an off state and including information of the subscribed terminal;
   receiving from the subscribed terminal, by the power manager, transmission power information of the subscribed terminal based on the information of the subscribed terminal;
   determining an uplink path loss of the subscribed terminal based on the transmission power information and the information of the subscribed terminal;
   determining, by the power manager, whether the uplink path loss of the subscribed terminal is supportable by the small base station; and
   when a service is supportable to the subscribed terminal, turning on, by the power manager, the small base station in the off state.

2. The method of claim 1, wherein determining whether the uplink path loss of the subscribed terminal is supportable by the small base station comprises determining whether the uplink path loss of the subscribed terminal is smaller than a handoff average path loss of the subscribed terminal.

3. The method of claim 1, wherein the uplink path loss of the subscribed terminal comprises a value determined by subtracting a control message reception power of the subscribed terminal from the transmission power of the subscribed terminal, wherein the transmission power information of the subscribed terminal is received through the control message.

4. The method of claim 1, wherein the information of the subscribed terminal comprises a Basic Connection Identifier (BCID) of the subscribed terminal.

5. The method of claim 1, wherein the small base station is in a closed access mode.

6. An apparatus of a small base station for performing power management, the apparatus comprising:
   a transceiver configured to communicate with a subscribed terminal and a macro base station; and
   a power manager configured to receive from the macro base station a notify message indicating that the subscribed terminal enters the macro base station that includes a small base station in an off state and including information of the subscribed terminal, receive from the subscribed terminal transmission power information of the subscribed terminal based on the information of the subscribed terminal, determine an uplink path loss of the subscribed terminal of the subscribed terminal based on the transmission power information and the information of the subscribed terminal, determine whether the uplink path loss of the subscribed terminal is supportable by the small base station, and when a service is supportable to the subscribed terminal, turn on the small base station in the off state.

7. The apparatus of claim 6, wherein the power manager is further configured to determine that the uplink path loss of the subscribed terminal is supportable by the small base station when the uplink path loss of the subscribed terminal is smaller than the handoff average path loss of the subscribed terminal.

8. The apparatus of claim 6, wherein the uplink path loss of the subscribed terminal comprises a value determined by subtracting a control message reception power of the subscribed terminal from the transmission power of the subscribed terminal, wherein the transmission power information of the subscribed terminal is received through the control message.

9. The apparatus of claim 6, wherein the information of the subscribed terminal comprises a Basic Connection Identifier (BCID) of the subscribed terminal.

10. The apparatus of claim 6, wherein the small base station is in a closed access mode.

11. A method for managing power of a small base station, the method comprising:
- receiving, by a power manager, information of at least one of a plurality of terminals from a macro base station that includes a small base station in an off state;
- receiving from the terminal, by the power manager, transmission power information of the at least one terminal based on the information of the at least one terminal;
- determining, by the power manager, an uplink path loss of the at least one terminal based on the transmission power information and the information of the terminal;
- determining, by the power manager, whether the uplink path loss of the at least one terminal is supportable by the small base station;
- determining, by the power manager, a number of the Plurality of terminals that is supportable by the small base station; and
- when the number of the plurality of terminals is greater than a predetermined reference number, turning on, by the power manager, the small base station in the off state.

12. The method of claim 11, wherein determining whether the uplink path loss of the at least one terminal is supportable by the small base station comprises, determining whether the uplink path loss of the at least one terminal is smaller than a handoff average path loss of the at least one terminal.

13. The method of claim 11, wherein the uplink path loss of the terminal comprises a value determined by subtracting a control message reception power of the terminal from the transmission power of the at least one terminal, wherein the transmission power information of the at least one terminal is received through the control message.

14. The method of claim 11, wherein the small base station is in a open access mode.

15. An apparatus of a small base station for performing power management, the apparatus comprising:
- a transceiver configured to communicate with a subscribed terminal and a macro base station; and
- a power manager configured to:
  - receive information of at least one of a plurality of terminals from the macro base station that includes a small base station in an off state,
  - receive from the at least one terminal transmission power information of the at least one terminal based on the information of the terminal from the terminal,
  - determine an uplink path loss of the at least one terminal based on the transmission power information and the information of the at least one terminal,
  - determine whether the uplink path loss of the at least one terminal is supportable by the small base station,
  - determine a number of the terminals that is supportable by the small base station and when the number of the terminals is greater than a predetermined reference number, turn on the small base station in the off state.

16. The apparatus of claim 15, wherein the uplink path loss of the at least one of terminals is supportable by the small base station when the uplink path loss of the terminal is smaller than a handoff average path loss of the terminal.

17. The apparatus of claim 15, wherein the uplink path loss of the at least one terminal comprises a value determined by subtracting a control message reception power of the at least one terminal from a transmission power of the at least one terminal, wherein the transmission power information of the terminal is received through the control message.

18. The apparatus of claim 15, wherein the small base station is in a open access mode.

\* \* \* \* \*